March 31, 1959 R. E. J. NORDQUIST ET AL 2,880,328
APPARATUS FOR DETECTING CONTAINERS HAVING MISMATCHED PARTS
Filed Nov. 23, 1954 4 Sheets-Sheet 2

INVENTORS
RONALD E. J. NORDQUIST
HAROLD T. ODQUIST
BY
ATTORNEYS

March 31, 1959 R. E. J. NORDQUIST ET AL 2,880,328
APPARATUS FOR DETECTING CONTAINERS HAVING MISMATCHED PARTS
Filed Nov. 23, 1954 4 Sheets-Sheet 3

INVENTORS
RONALD E. J. NORDQUIST
HAROLD T. ODQUIST
BY
ATTORNEYS

March 31, 1959 R. E. J. NORDQUIST ET AL 2,880,328
APPARATUS FOR DETECTING CONTAINERS HAVING MISMATCHED PARTS
Filed Nov. 23, 1954 4 Sheets-Sheet 4
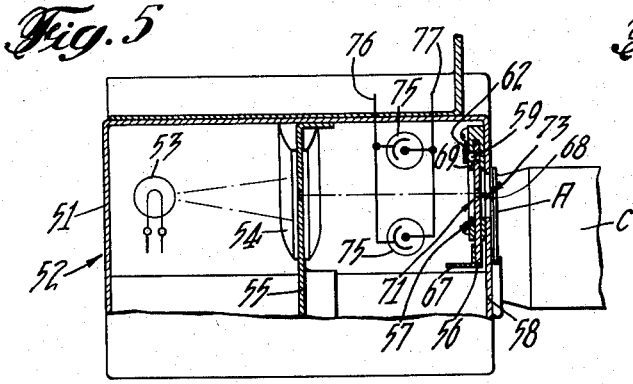
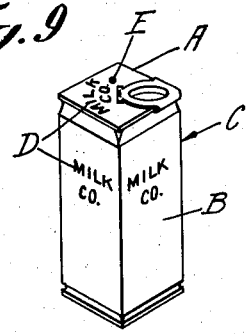
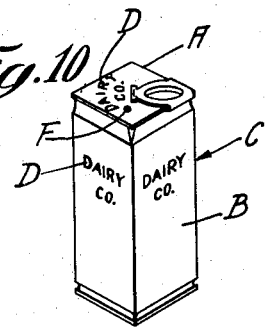
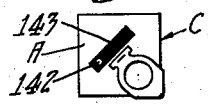
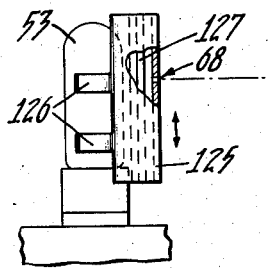
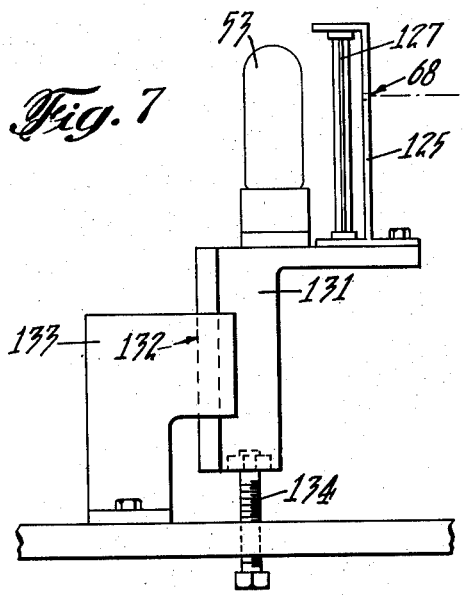
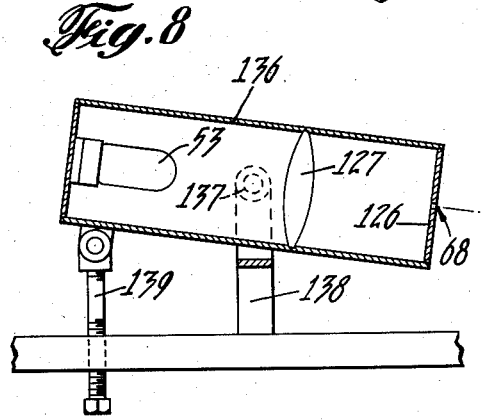
INVENTORS
RONALD E. J. NORDQUIST
HAROLD T. ODQUIST
BY Charles H. Lane
Leland R. McCann
George W. Reifer
ATTORNEYS

United States Patent Office 2,880,328
Patented Mar. 31, 1959

2,880,328

APPARATUS FOR DETECTING CONTAINERS HAVING MISMATCHED PARTS

Ronald E. J. Nordquist, Summit, N.J., and Harold T. Odquist, Yonkers, N.Y., assignors to American Can Company, New York, N.Y., a corporation of New Jersey Application November 23, 1954, Serial No. 470,718

5 Claims. (Cl. 250—223)

The present invention relates to a method of and apparatus for detecting containers having mismatched parts such as tops and bodies and has particular reference to steps of and devices for inspecting or scanning the containers through code marks selectively placed on an exterior wall of the container and having reflectivity differing from the reflectivity of a contrasting background.

In the manufacture of containers such as for example fibre milk containers and the like, cooperating parts of the containers such as tops and bodies sometimes carry advertising or other printed matter. Such container parts usually are printed in the flat and are subsequently formed into shape and assembled to produce complete containers. Usually these operations are performed on different machines which may be widely separated and which require the exercise of continual vigilance in bringing together matching parts for assembly. Such vigilance and care are not always possible in a busy factory and it often happens that container tops of one customer are inadvertently assembled to bodies of another customer, for example Borden tops on Sheffield bodies or vice versa, with costly results.

The instant invention contemplates overcoming these difficulties by providing an apparatus for inspecting or scanning the containers to detect mismatched parts through the use of selected code marks for the containers of each customer.

An object, therefore, of the invention is the provision of a method of and apparatus for checking or comparing the code marks on one of the container parts with a comparator selected in accordance with and corresponding to the other of said container parts to insure that both parts match.

Another object is the provision of such a method and apparatus wherein mismatched container parts may be accurately and quickly detected and containers having such mismatched parts segregated from containers having normally matched parts to prevent marketing of improper containers.

Numerous other objects and advantages of the invention will be apparent as it is better understood from the following description, which, taken in connection with the accompanying drawings, discloses a preferred embodiment thereof.

Referring to the drawings:

Figs. 5, 6, 7 and 8 are partially sectional and partially elevational views of modified forms of detecting devices which may be used in the machine, parts being broken away;

Figure 1:
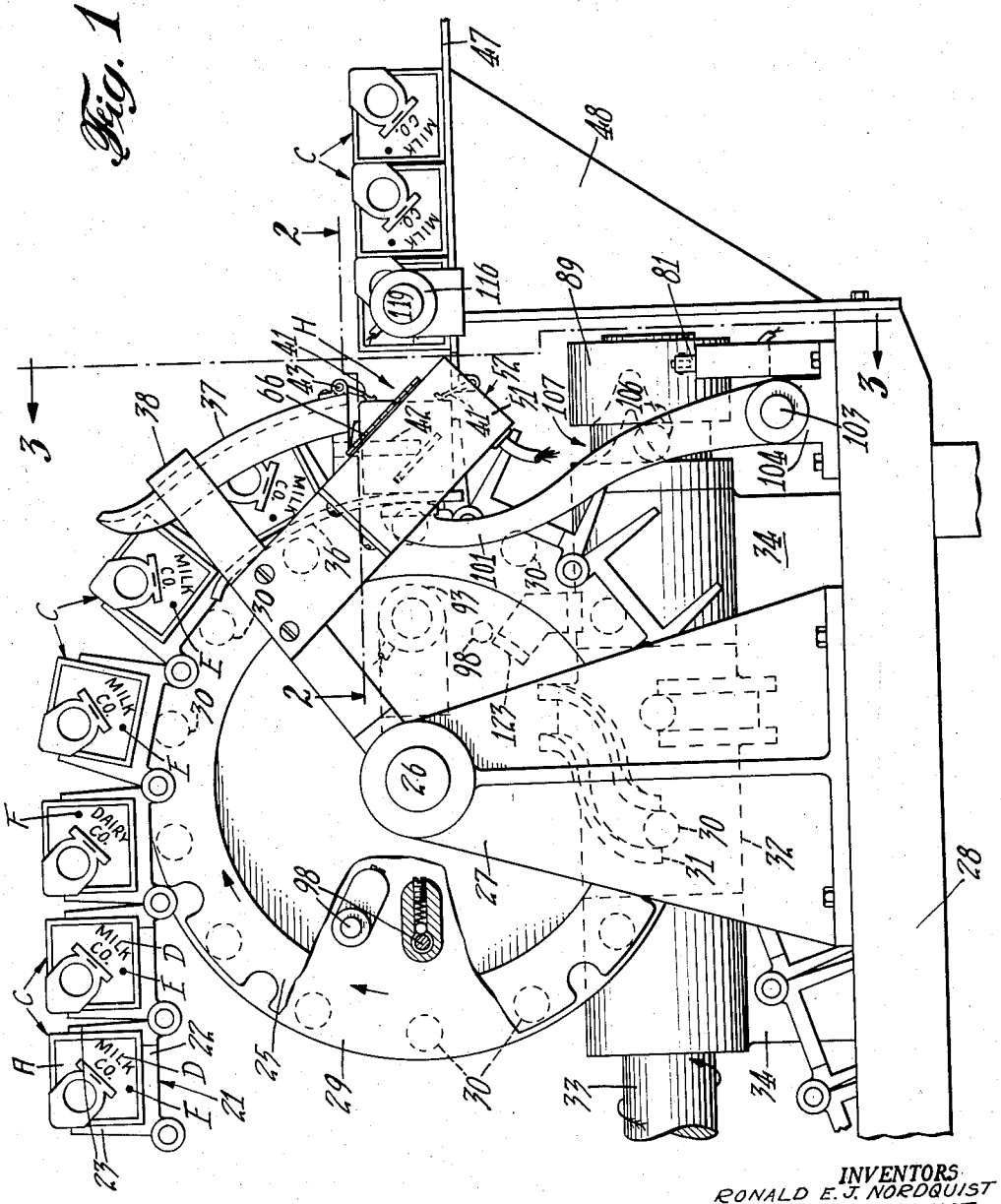
Figure 1 is a fragmentary side elevation of a container making machine including devices embodying the instant invention and for carrying out the method steps of the invention, parts of the machine being broken away.

Figs. 9, 10, and 11 are perspective views of containers to be inspected in the machine, Figs. 9 and 10 showing containers having properly matched parts and distinguishing code marks and Fig. 11 showing a container having mismatched parts; and Fig. 12 is a top plan view of the top of a container having a modified form of code mark.

As a preferred or exemplary embodiment of the invention Figs. 1, 2, 3 and 4 of the drawings illustrate principal parts of the discharge end of a container making machine of the character disclosed in United States Patent 2,200,276, issued May 14, 1940, to J. M. Hothersall et al. on a Can End Assembling Machine for assembling flat rectangular fibre top end members A (Fig. 9) to rectangular fibre container bodies B to produce the well known fibre milk containers C of the character disclosed in United States Patent 2,085,979, issued July 6, 1937, to J. M. Hothersall.

The top end member A and the body B of each container C carry printed matter D which is particular to each dairy and therefore in assembling the printed parts of such containers it is essential that the proper parts be brought together for assembly. Figures 9 and 10 show examples of properly assembled parts wherein the top and body parts are labeled for example with the same company name, i.e. respectively "Milk Co." and "Dairy Co." Fig. 11 illustrates a container having mismatched printed parts, the top being marked "Dairy Co." and the body being marked "Milk Co." It is essential that even one such container be prevented from getting out into commercial use and it is to the detection and segregation of such containers that this invention is directed.

Such an assembly of mismatched parts is usually brought about by improper selection of the end members or an inadvertent mixing of the end members in the container manufacturing plant. The container bodies usually are fed directly from the bodymaker into the end assembling machine so that little trouble is occasioned from this source, whereas the end members are produced in a separate machine and are transferred manually in stacked relation from the end making making machine to the assembling machine. Also end members frequently are withdrawn from the manufacturing line for inspection and are occasionally returned to the wrong line to become a part of a stack to which they do not belong.

To detect these mismatched end members, the end members printed for each dairy company are marked with a code mark which is located in a predetermined position and is peculiar to a particular company. For example, the end member for the "Milk Co." container shown in Fig. 9 is provided with a black spot or code mark E, circular or rectangular in shape and located adjacent the upper end of the hinge lug of the friction plug as illustrated in this figure. All containers for "Milk Co." bear this code mark in this particular position.

In a similar manner a spot or code mark F is provided for the containers for the "Dairy Co.," this code mark being located adjacent the lower end of the hinge lug of the friction plug as shown in Fig. 10. All containers for "Dairy Co." bear this code mark in this particular location. Containers for other companies have the same kind of a code mark located in a different position. The code mark positions preferably are disposed in a straight line extending diagonally across the top of the container end member immediately adjacent the hinge lug of the friction plug. However the invention is equally well applied to code marks in other positions and on the container bodies as well as the end members or even on both bodies and end members. The code marks may be used singly or in multiples of two or more to designate containers of different companies. These code marks preferably are of a dark non-reflective substance as compared with the light reflective walls of the container as a whole.

In the method of detecting containers having mismatched assembled end and body members, one of the container members, preferably the end member, is provided with a non-reflecting code mark disposed in a predetermined location selected to designate the container of a particular company. During inspection of the assembled containers, they are fed along a predetermined path of travel in a substantially continuous procession, past a comparator, preferably a radiant energy sensitive device, arranged to project a restricted beam of radiant energy onto a predetermined spot in the path of travel of the containers, the particular location of the spot being selected in accordance with the position of the code marks on the containers intended to be inspected. For example the comparator is set in accordance with the kind of body being inspected.

As the containers are advanced along this path of travel the code bearing surface of the containers is presented to and accurately located at the comparator so as to compare the location of the code marks on the container with the setting of the comparator to detect a mismatched assemblage of container parts. Since the code marks preferably are located on the end members A it is this surface that is presented to and accurately located relative to the comparator, the comparator being set in accordance with the kind of container bodies being advanced past it and thereby comparing through the code marks on the ends, the kind of end member assembled with the selected container bodies.

Containers presented to the comparator having code marks in the same location as the spot of radiant energy projected by the comparator, render the comparator inoperative through non-reflection of the spot of radiant energy from the code marks to indicate properly matching container end and body members. Conversely, containers having code marks in any other location activate the comparator through reflection of its spot of radiant energy from the container to indicate detection of mismatching container end and body members. The activation of the comparator is utilized to segregate the detected container or containers having mismatched members so that these abnormal containers may be withheld from use.

In the machine, the code marked containers C are disposed in a horizontal position, lying on their side, all in the same respective relation, with their top end members in substantially the same plane as shown in Fig. 1. In this position the containers are advanced intermittently in processional order, by an endless chain conveyor 21 comprising a plurality of linked together cradles each having a bottom member 22 and a pair of outwardly extending prongs 23 forming a three sided pocket which closely confines each container C.

The conveyor 21 operates over and is driven by a sprocket 25 mounted on a horizontal shaft 26 (see also Fig. 3) journaled in bearing brackets 27 secured to a machine base plate 28. The sprocket 25 and the shaft 26 are rotated intermittently by a conventional indexing mechanism comprising an indexing disc 29 mounted on the shaft 26 and carrying a plurality of cam rollers 30 spaced in a circle adjacent the outer periphery of the disc. These cam rollers 30 are spaced apart an angular distance equivalent to the lineal spacing of the containers C in their conveyor cradles.

The cam rollers 30 are successively engaged by an interrupted cam track 31 of an indexing cam 32 (Fig. 1) mounted on a continuously rotating drive shaft 33 journaled in bearing brackets 34 secured to the machine base 28. The drive shaft 33 is the main drive shaft of the machine and is rotated in any suitable manner such as shown in the above Hothersall Patent 2,200,276.

In such an indexing device, the continuously rotating indexing cam 32 during a portion of each revolution rotates the sprocket 25 through a partial rotation in clockwise direction as viewed in Fig. 1 to advance the conveyor 21 and hence advance each container on the conveyor through one container space and then during the remainder of the revolution holds the conveyor and the containers stationary for the inspection operation. For this latter purpose the conveyor 21 advances the containers C individually into an inspection station H (Fig. 1) disposed adjacent the outer periphery of the sprocket 25.

As a container C is advanced into the inspection station H it is guided by inner and outer curved guide rails 36, 37 (Figs. 1, 2 and 3) which retain the container in its conveyor cradle. These guide rails are secured to a stationary inverted U-shaped bracket 38 which extends out from the sprocket shaft bearing brackets 27. The container upon entering the inspection station H is shifted into a predetermined location to accurately locate the code marks on the end of the container. This location of the container is brought about by a set of four side fingers 41 and an end finger 42 which are disposed in the path of travel of the container. These fingers 41, 42 are carried on pivot pins 43 (Fig. 3) secured in stationary lugs 44 and have tension springs 45 surrounding the pins to yieldably press the fingers toward the container.

Two of the lugs 44 are secured to the lower ends of the outer guide rails 37 (Fig. 3) to locate two of the fingers 41 adjacent the upper edge of a container at rest at the inspection station. Another two of the lugs 44 are secured to the inner end of a flat horizontal discharge table 47 which is flush with the lower edge of a container C at the inspection station H and is carried on a bracket 48 secured to the machine base 28. The fifth lug 44 for the end finger 42 is secured to the adjacent lower end of the outer guide rail 37.

The fingers 41 on the upper lugs 44, depend from the lugs and extend partially into the path of travel of a container entering the inspection station H. The fingers 41 on the lower lugs 44 project upwardly in substantially the same vertical plane as the depending fingers 41 and in a similar manner extend partially into the path of the container. Stops on the lugs 44 limit the travel of the fingers into the path of the container so that the containers can move past them without being damaged. Similarly the end finger 42 depends from its lug 44 into the path of travel of the end of the container.

Accordingly as a container moves down into the inspection station H, it pushes the fingers 41, 42 outwardly to move into inspecting position, with the result that the reaction of the fingers 41 against the side of the container forces the container into tight contact with the inner guide rail 36 and thus accurately locates the container at the station. Simultaneously with this action the end finger 42 pushes the container endwise, toward the left as viewed in Figs. 2 and 3, and thus moves the code marked end A of the container into engagement with a housing 51 of a detecting device or comparator 52 (Figs. 1, 2, 3 and 4) which is utilized to inspect the code marks E, F on the containers.

The housing 51 of the detecting device or comparator 52 preferably is disposed in an angular position as shown in Fig. 1 and for this purpose is secured to the U-shaped bracket 38. The housing 51 contains a source of radiant energy, such as a lamp 53 (Fig. 2) which when activated projects rays or beams of energy into and through a lens 54 secured in a partition 55 of the housing 51. The lens (Figs. 2 and 5) converts the rays of energy into a plurality of straight line beams and projects them against a removable shield 56 which preferably is a flat rectangular slide held in an accurately fitted slideway 57 secured to a partition 58 formed in the housing 51.

The slide 56 is locked in position accurately by a pair of small balls 59 disposed in retaining holes in a cover plate 61 over the slideway 57. The balls 59 are backed up by leaf springs 62 which are secured to the cover plate 61 and which press the balls into slide locking holes 64 formed in the slide 56 (see Figs. 2 and 4). The slide 56 is adapted to be inserted into position and removed from the slideway 57 through an opening 65 formed in the side of the housing 51 and normally kept closed by a door 66 hingedly secured to the housing to prevent admittance of outside light into the housing. A handle 67 is provided on the slide 56 to facilitate its insertion and removal into and from the slideway.

The slide 56 is one of a plurality of such slides which are used in the comparator 52 individually. A different slide is provided for each arrangement of code marks on the end members A of the containers C, i.e., one for each company for which containers are made, and each slide is formed with one or more small apertures 68 (Fig. 4) located precisely in a predetermined position in the slide to correspond with a similar arrangement of one or more code marks on the end member A of a container for a corresponding company and properly located for inspection at the station H. A slide 56 is selected to match the containers to be run through the machine to thus test the code marks on the ends A of the containers to detect mismatched container parts as hereinbefore explained.

In the comparator 52, the radiant energy beams from the lens 54 project through a slot 71 (Figs. 2 and 4) in the cover plate 61 and impinge against the selected slide 56 held in the slideway 57. The slide 56 stops further projection of all beams of energy except those which pass through the one or more apertures 68 in the slide. These continuing beams of energy pass through a slot 72 in the partition 58 and continue to project through a similar slot 73 in the outer end wall of the housing 51 where the end A of the located container C at the inspection station is held tightly against the housing.

Radiant energy beams passing through the slot 73 in the outer wall of the housing impinge against the end member A of the container at the inspection station. If the container C accurately located at the inspection station H has the proper end member A assembled with it, the code marks on the end member perfectly align with the apertures 68 in the selected slide 56 and hence the beams of radiant energy permitted to pass through the apertures 68 and slots 72, 73 impinge against the code marks and are absorbed by them, thus causing no reflection of the beams of energy.

Figure 2:
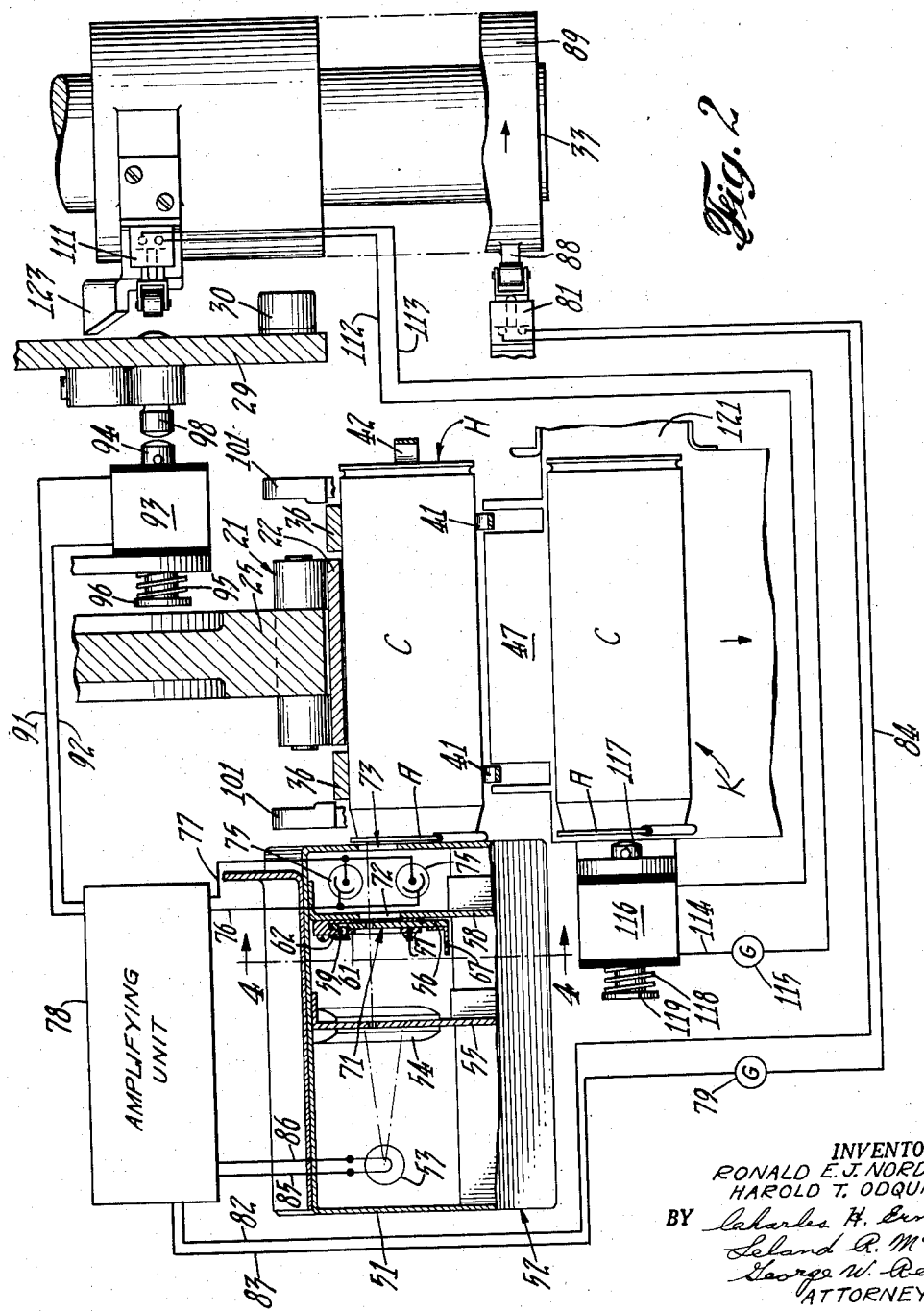
Fig. 2 is an enlarged horizontal section taken substantially along the broken line 2—2 in Fig. 1, with parts broken away, and including a wiring diagram of the electrical apparatus used in the machine.
Figure 3:
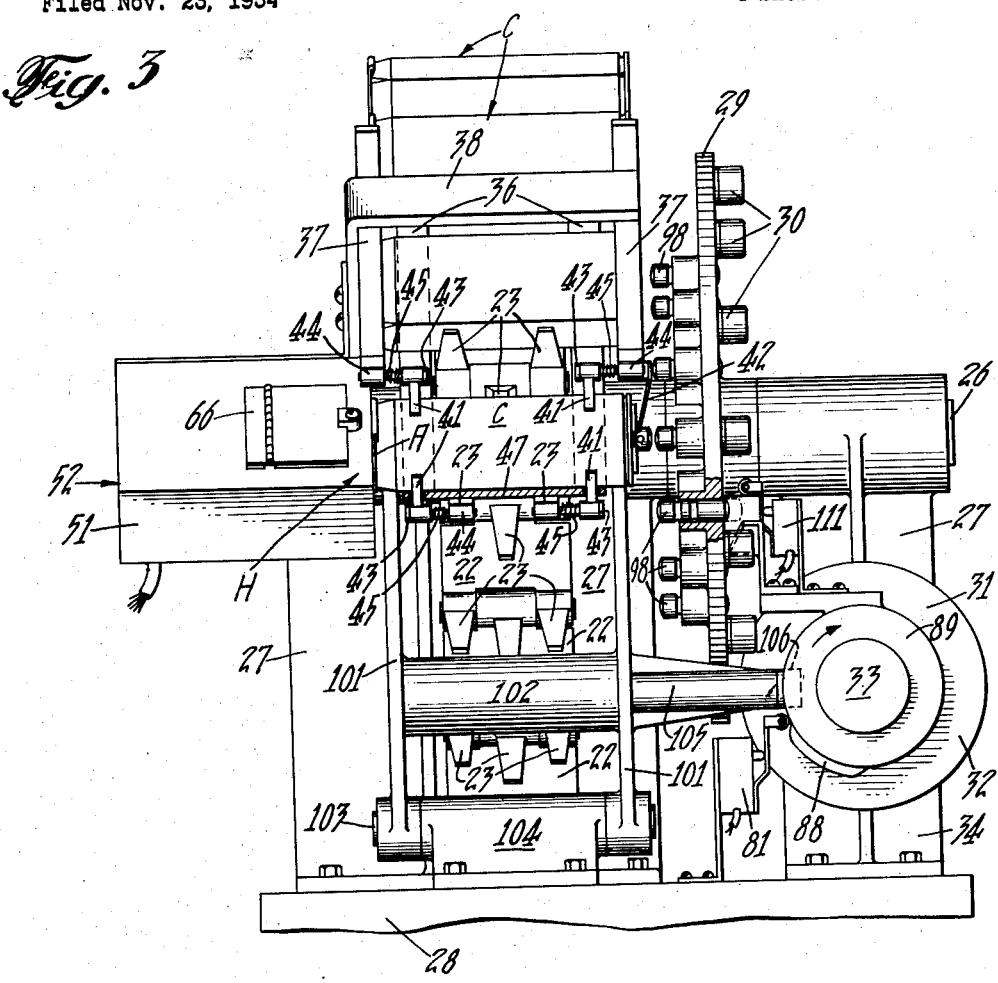
Fig. 3 is a vertical section taken substantially along the broken line 3—3 in Fig. 1, with parts broken away.
Figure 4:
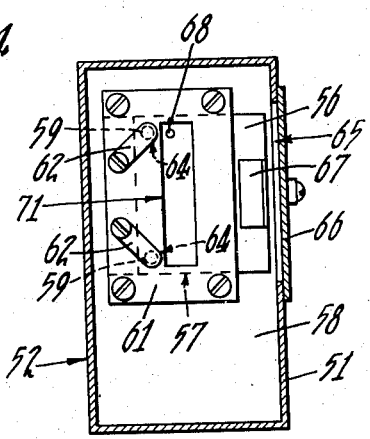
Fig. 4 is an enlarged sectional detail taken substantially along the line 4—4 in Fig. 2.

However, if an improper end member A is attached to the container C, the code marks on the end member do not align with the apertures 68 in the selected slide 56 and hence the projected beams of radiant energy impinging against the bright background of a non-coded portion of the container end member are reflected back into the housing 51. These reflected beams of energy are collected by one or more (a pair being shown) energy sensitive photoelectric cells 75 which are disposed in the housing 51 preferably between the partition 58 and the outer end wall of the housing as shown in Fig. 2. These photoelectric cells 75 upon being excited by the reflected beams of energy, activate discharge devices which segregate containers with mismatched parts from containers with properly matched parts. For this purpose the photoelectric cells 75 are electrically connected with the discharge devices as will now be explained.

The photoelectric cells 75 as shown in the drawings are connected in parallel by a pair of wires 76, 77 (Fig. 2) to a conventional amplifying unit 78. The amplifying unit is connected to a source of electric current, such as a generator 79 (Fig. 2), through a normally open, cam actuated, electric switch 81 which controls the flow of current to the unit and the lamp 53 so that these elements are in operation only during a predetermined period and are cut off during movement of the container C into and out of inspection station H. For this purpose a wire 82 connects the amplifying unit 78 with one side of the switch 81. Another wire 83 connects the amplifying unit 78 with the generator 79 which in turn is connected by a wire 84 to the opposite side of the switch 81. A pair of wires 85, 86 also connect the lamp 53 to the amplifying unit 78.

When a container C is fully located and is at rest at the inspection station H, the normally open switch 81 is momentarily closed to permit electric current from the generator 79 to flow along the circuit to the amplifying unit 78 and lamp 53 to cause the lamp to project a beam of light onto the code marked end of the located container C. This closing of the switch 81 is effected by a cam lug 88 (Figs. 2 and 3) formed on the hub of a barrel cam 89 mounted on the main drive shaft 33 so that the opening and closing of the switch is effected in time with the advancement of the container by the conveyor 21 and while the container is at rest at the inspection station.

The amplifying unit 78 is also connected by a pair of wires 91, 92 (Fig. 2) to a normally deenergized solenoid 93 having a moveable core 94 normally held in a retracted position by a compression spring 95 disposed between the solenoid casing and an enlarged head 96 on the core 94. The solenoid 93 is energized by the amplifying unit 78 through operation of the photoelectric cells 75. When these cells 75 are excited through reflection of the light beam from the container C as hereinbefore mentioned, the current generated in the cells is amplified by the unit 78 and conducted to the solenoid 93 to energize the solenoid and thus cause its moveable core 94 to be projected outwardly into the path of travel of time delay indexing pins 98 slideably carried in the indexing disc 29 (see Figs. 1, 2 and 3).

There is one of the indexing pins 98 disposed adjacent and inwardly of each of the indexing cam rollers 30 on the disc 29 so that each container C as it travels around the sprocket 25 is represented by an indexing pin 98. When a container C is at rest at the inspection station H, the indexing pin 98 for this container is disposed directly opposite and in horizontal alignment with the solenoid core 94 so that when an abnormal container is detected at the station, the outwardly moving solenoid core 94 engages endwise and pushes the adjacently disposed indexing pin 98 further into the disc 29. This causes the pin 98 to project from the opposite or outer face of the disc for operation of the abnormal container discharge devices to be hereinafter explained.

Upon completion of the container inspecting operation, i.e. after the switch 81 is permitted to open and close and before the conveyor 21 moves through another stepped advancement, the inspected container C is removed from the inspection station H. This is effected by a pair of spaced and parallel, upright pusher arms 101, (Figs. 1, 2 and 3) which are connected by a spacer web 102. At their lower ends the arms 101 are mounted on a pivot shaft 103 carried in a bearing bracket 104 secured to the machine base 28. One of the arms 101 is formed with a laterally extending boss 105 which carries a cam roller 106 which operates in a cam groove 107 of the barrel cam 89 so that the pusher arms 101 are actuated in time with the conveyor 21.

At the proper time in the cycle of operation of the machine the pusher arms 101 rock outwardly from the position shown in Fig. 1 and thereby engage behind the container at the inspection station H and push it horizontally outward onto the table 47. The container is received at an abnormal container discharge station K (Figs. 1 and 2). As each container C enters the station K it engages and pushes forward the other previously received containers, thereby forming a procession of contiguous containers supported on the table and advanced therealong by each other to any suitable place of deposit.

When an abnormal container C, i.e. a container having mismatched parts, is received at the station K it is immediately segregated from the others by the actuated indexing pin 98 hereinbefore described. The pin 98 pushed in by the solenoid 93 for the abnormal container at the inspection station H, advances one step with the disc 29 after the container is removed to the station K and the conveyor 21 is actuated to advance the next container into the inspection station. The container pushed into the station K is fully at rest before the conveyor starts moving so as to prevent interference between the pusher arms 101 and the container entering the inspection station H.

During the movement of the conveyor 21 the pushed-in pin 98 snaps past a normally open electric switch 111 (Figs. 2 and 3) which is connected by wires 112, 113, 114 to a source of electric current, such as a generator 115 and to a solenoid 116 disposed at the discharge station K. The solenoid 116 is provided with a movable core 117 located in endwise relation to the container at the station K. The core 117 is normally held in a retracted position by a compression spring 118 interposed between the solenoid casing and an enlarged head 119 on the core.

When the switch 111 is momentarily closed by the passing of the pushed-in pin 98, electric current flows along the circuit and momentarily energizes the solenoid 116. Energization of the solenoid projects the core 117 forcibly into engagement with the end of the container and thereby pushes or knocks the container endwise off the table 47 and into an inclined discharge chute 121 (Fig. 2) which directs the container to any suitable place of deposit segregated from the properly assembled containers. After momentarily closing the switch 111, the pin 98 engages a stationary cam 123 (Fig. 2) which pushes the pin back into its original position for a repeat operation.

In this manner, each container C as it is advanced into the inspection station H is precisely located with reference to the comparator 52 and is tested through its code marks for matching of its end member A and body B and thereafter is tranferred to the station K. If the container while at the inspection station H is detected through its code marks as having mismatched end member and body parts, the comparator 52 sets in motion the delay device which discharges and segregates the detached container when it reaches the discharge station K. Otherwise the containers reaching the station K push each other along the table 47 to any suitable place of deposit for containers having properly matched parts.

In a modified form of the comparator 52 as shown in Fig. 5, the partition wall 58 in the casing 51 as shown in Fig. 2 is removed and the slide 56 and its holding slideway 57 are located immediately adjacent the end wall of the casing 51 so that it is close to the code marked end A of the container held in place against the comparator. This is a slightly simpler form of the comparator which has been found to operate satisfactorily.

An important feature of the invention is to project a beam of radiant energy covering a predetermined area to produce a spot of such energy at a precise location on a precisely located container to compare the location of the code marks on the container with the predetermined setting of the spot of energy to detect mismatched container parts when the code marks do not exactly align with the spot of energy and thereby permit reflection of the energy to the photoelectric cells 75.

Projection of this spot of radiant energy to a precise location may be effected in any suitable manner, other than by the use of the different slides 56 hereinbefore described. Fig. 6 illustrates a modified form covering this feature of the invention in which the aperture or apertures 68 which govern the area of the spot of energy, is formed in a curved shield 125 having clamp fingers 126 which surround the lamp 53 or a support adjacent the lamp, and upon which the shield may be shifted for vertical adjustment of the beam of energy projected through the aperture or apertures 68 to locate the spot in a predetermined position on the container. A lens 127 is interposed between the lamp 53 and the shield 125 to properly project the beam of energy through the aperture in the shield.

Another modified form is illustrated in Fig. 7 wherein the lamp 53, shield 125, and lens 127 are mounted on a movable bracket 131 which slides in a slideway 132 of a stationary bracket 133. An adjusting screw 134 interposed between a stationary part of the machine and the movable bracket 131 is provided for adjustment of the beam of energy projected through the aperture 68 onto a precise location to coincide with code marks on containers having matched parts.

In a still further modification as shown in Fig. 8, the lamp 53 and the lens 127 are disposed in a housing 136 having an end wall 126 serving as a shield. The aperture 68 is formed in the end wall 126 for the projection of the beam of energy therethrough. The housing 136 intermediate its ends is mounted on pivot pins 137 secured in a stationary yoke 138 so that the housing may be tilted by an adjusting screw 139 to project the spot of energy to a selected position as hereinbefore mentioned.

In the preferred form of the apparatus and in all of the modified forms it has been found that for high speed inspection it is preferred to maintain the lamp 53 in continuous operation so as to provide for better control of the intensity of the beam projected upon the containers. In such cases the electric timing switch 81 preferably is connected to the proper wires in the amplifying unit 78 to control the operation of the photoelectric cells 75 instead of the lamp 53. This same result however is obtained in another manner by connecting the switch 81 to one of the photoelectric cell wires 76, 77.

Although the invention as hereinbefore described and explained is directed to a method of and apparatus for inspecting and scanning the containers through relatively dark or nonreflecting code marks on the containers, it should be understood that the same result can be accomplished by and that the instant invention is intended to cover the inspecting and scanning of the containers through, an opposite method i.e. through reflecting code marks as illustrated in Fig. 12 of the drawings. In this case, light colored reflecting code marks 142 are provided on a dark or nonreflecting background 143 carried by the containers or parts thereof, and the comparator 52 is wired to keep the photoelectric cells 75 in normally operative condition instead of normally inoperative condition as in the preferred form as above described and explained.

Hence containers presented to the comparator 52 and having reflective code marks 142 in the same location as the spot of radiant energy projected by the comparator, render the comparator operative through reflection of the spot of radiant energy from the code marks to indicate properly matching container end and body members. Conversely, containers having code marks 142 in any other location deactivate the comparator through nonreflection of its spot of radiant energy from the nonreflective background 143 on the container to indicate detection of mismatching container end and body members. The deactivation of the comparator is utilized to segregate the detected container or containers having mismatched members in the same manner and by the same devices as in the preferred form of the invention, so that these abnormal containers may be withheld from use.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

We claim:

1. In a machine for detecting containers having mismatched tops and bodies through code marks selectively placed on an exterior wall of the containers and having a reflectivity differing from the reflectivity of a contrasting background, the combination of a housing enclosing a source of radiant energy and at least one radiant energy sensitive element, said source of energy comprising the sole effective means for supplying radiant energy to said sensitive element, said housing having an opening disposed in alignment with said source of radiant energy for the projection of said energy therethrough, an apertured masking shield disposed in said housing and interposed between said source of radiant energy and said opening for producing in said opening a spot of radiant energy of predetermined proportions and in a predetermined location selected in accordance with the position of the code marks on the containers to be tested, and means for locating said containers individually adjacent said opening for locating said code marks in alignment with said spot, so that containers having code marks in the same location as said spot affect the operation of said detector device through the reflection of said energy on said sensitive element in accordance with the reflectivity of said code marks to indicate properly matched container tops and bodies and containers having code marks in any other location affect the operation of said detector device through the reflection of said energy on said sensitive element in accordance with the reflectivity of said contrasting background to indicate mismatching container tops and bodies.

2. A machine of the character defined in claim 1 in which said masking shield comprises a removable slide and in which said housing is provided with a holder for accurately locating and holding said shield in a predetermined position so that a plurality of interchangeable masking shields having apertures disposed in different predetermined locations may be selectively and individually disposed in said holder to permit corresponding variations in the position of the code marks on normal containers.

3. A machine of the character defined in claim 2 in which said shield and said holder are provided with means for locking and shield in proper position in said holder.

4. A machine of the character defined in claim 1 wherein said opening in the housing is smaller than said exterior wall of the containers on which said code marks are placed, and said means for locating the containers individually adjacent said opening includes means for moving said container wall into engagement with said housing wall around the opening therein to exclude extraneous radiant energy from said housing during inspection of the container wall by the detector device.

5. A machine for distinguishing abnormal containers formed with top walls which do not match the container bodies from normal containers having matching top walls and bodies through code marks selectively positioned on the top walls of said containers and having a reflectivity differing from the reflectivity of a contrasting background, comprising in combination a conveyor for advancing said containers intermittently and in side by side relationship with their top walls positioned in a plane substantially parallel to their path of travel, an inspection station, a detector device disposed at said inspection station, means at said inspection station for aligning the top wall of each of said containers with said detector device, said detector device including a source of light and a removable apertured masking shield disposed between said source of light and said aligned top wall for producing on said top wall a spot of light of substantially the same dimensions as said code marks and positioned to coincide with the selected position of the code marks on the top walls of normal containers so that said spot impinges upon the code marks of normal containers and impinges upon the contrasting background of abnormal containers, said detector device also including means for accurately positioning and holding said removable shield in a predetermined position so that a plurality of interchangeable masking shields having apertures disposed in different predetermined locations may be selectively and individually disposed in said holder to permit corresponding variations in the position of code marks on normal containers, and light sensitive means disposed in said detector device and responsive to the intensity of the reflection of said spot of light from said containers for indicating abnormal containers.

References Cited in the file of this patent

UNITED STATES PATENTS

| | | |
|---|---|---|
| 1,824,432 | Hendry | Sept. 22, 1931 |
| 1,838,389 | Goldberg | Dec. 29, 1931 |
| 2,056,382 | Ayers et al. | Oct. 6, 1936 |
| 2,224,646 | Freedman et al. | Dec. 10, 1940 |
| 2,385,700 | Garlits | Sept. 25, 1945 |
| 2,618,381 | Samain | Nov. 18, 1952 |
| 2,657,799 | Johnson et al. | Nov. 3, 1953 |
| 2,693,277 | Wagner | Nov. 2, 1954 |